O. G. HALVORSEN, F. S. HUDSON AND E. G. RHOADS.
BURNER.
APPLICATION FILED FEB. 18, 1920.
1,383,719.
Patented July 5, 1921.
4 SHEETS—SHEET 1.
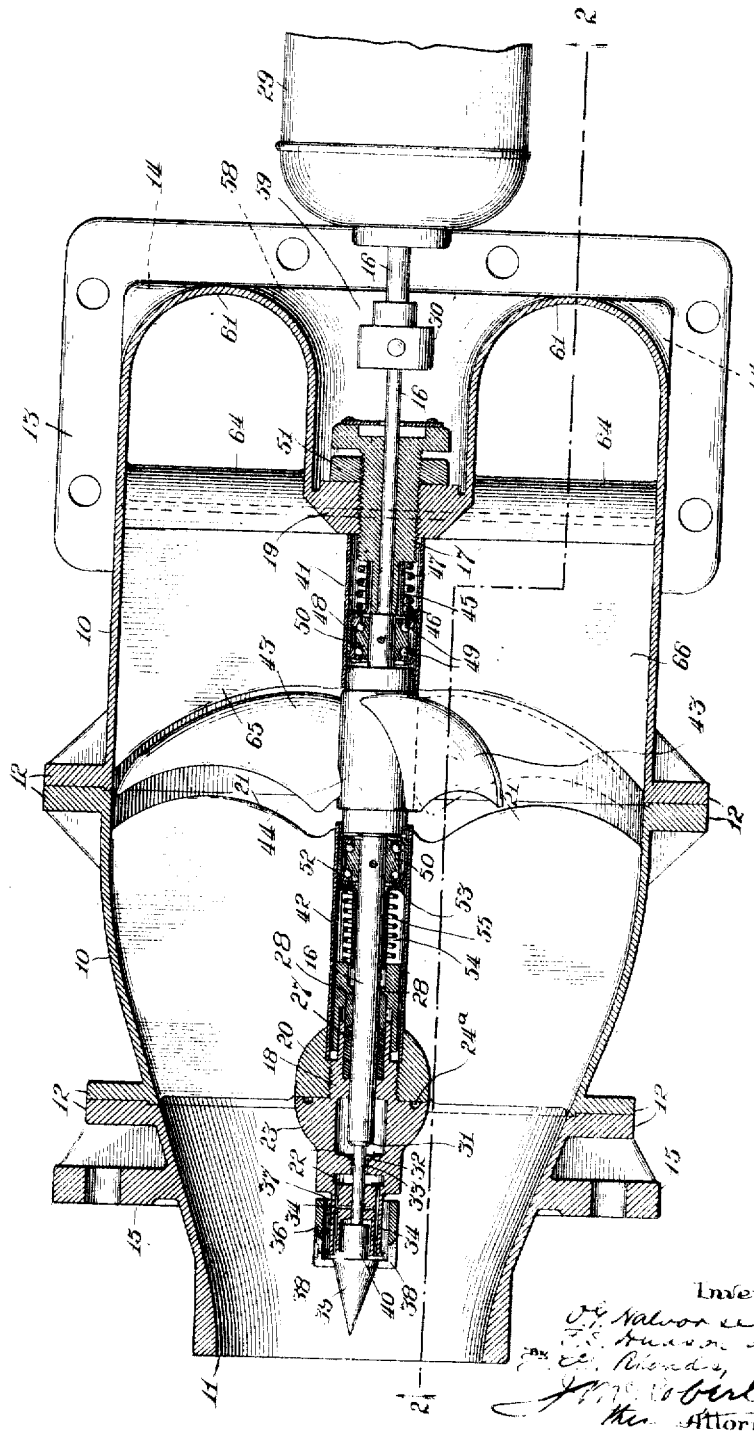

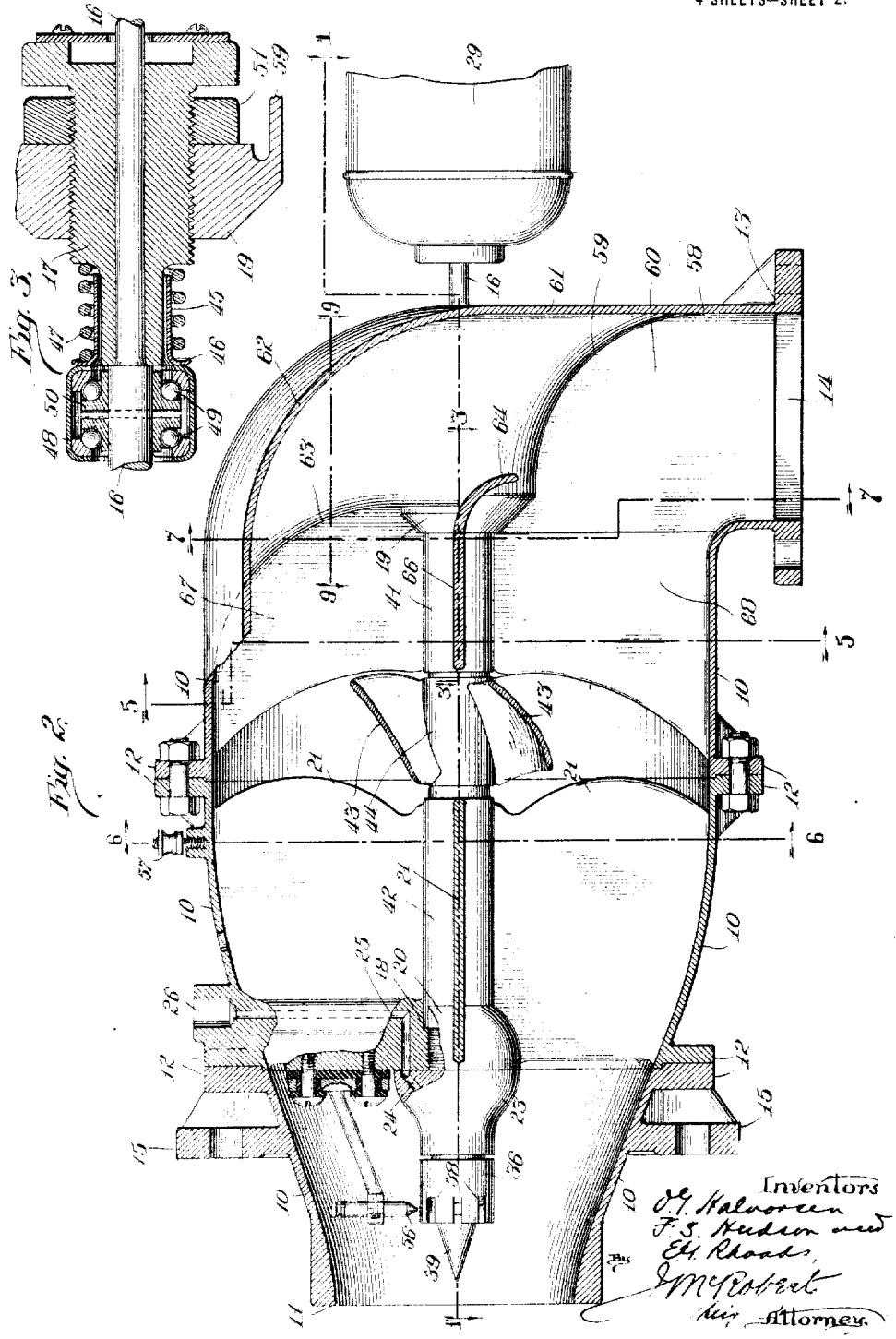

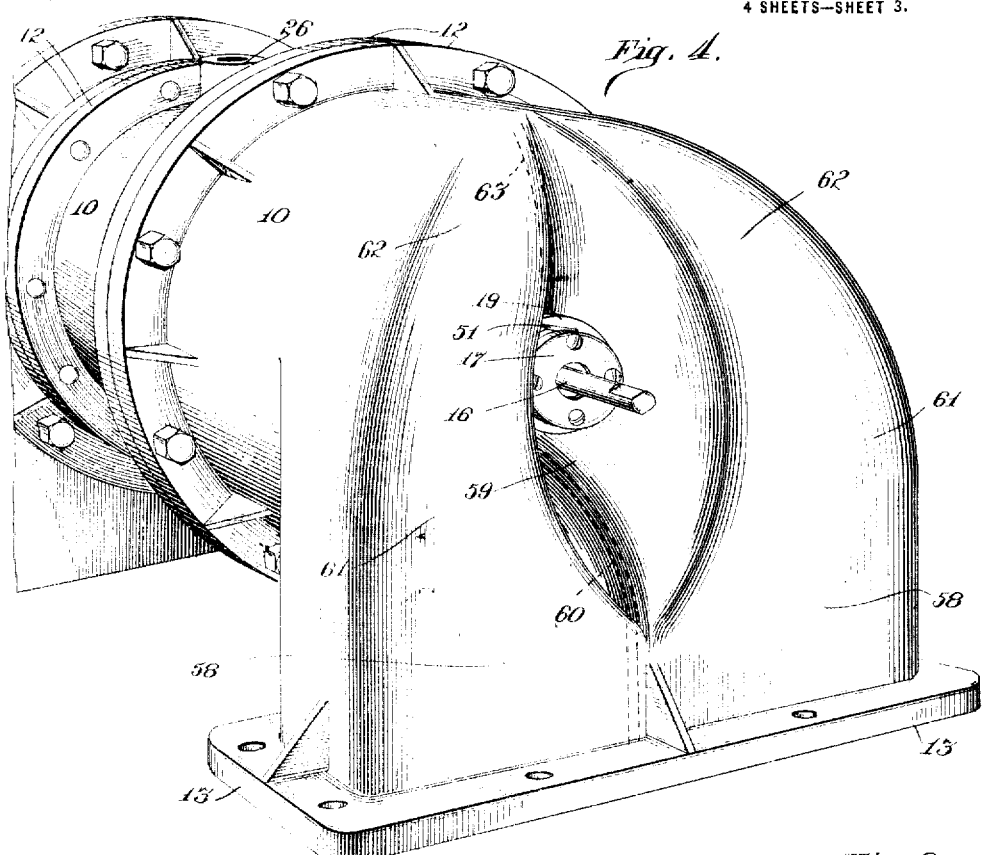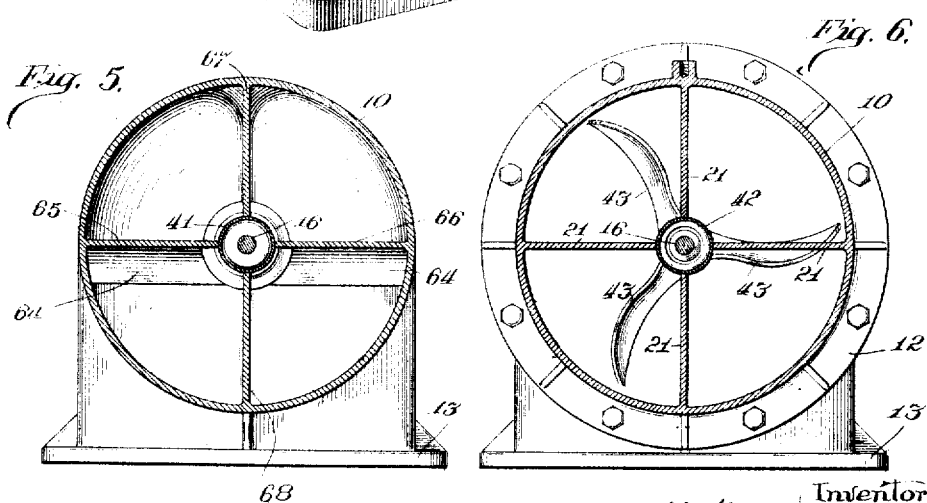

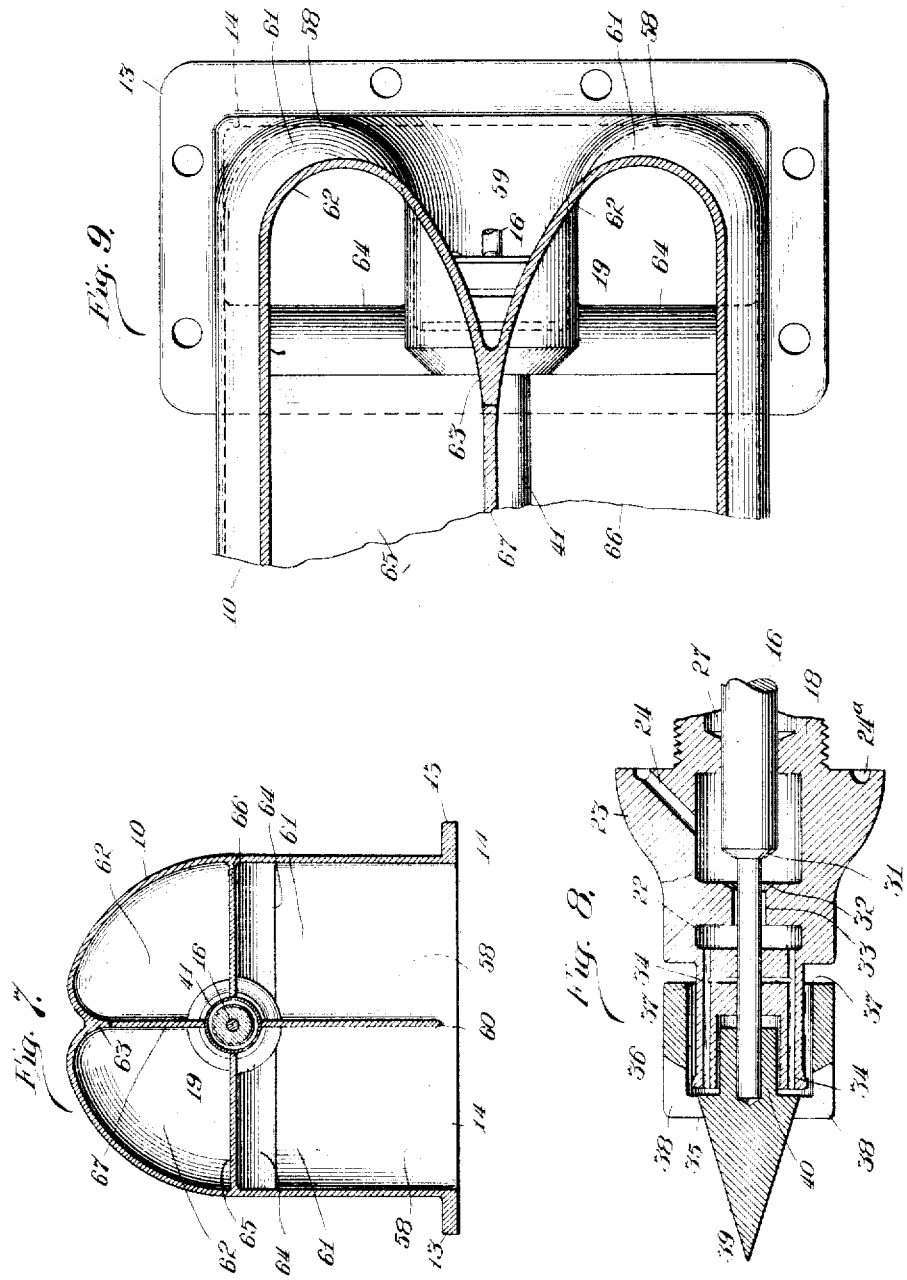

UNITED STATES PATENT OFFICE.

OLE G. HALVORSEN, OF CHICAGO, ILLINOIS, FINN S. HUDSON, OF KANSAS CITY, MISSOURI, AND EDGAR G. RHOADS, OF OAK PARK, ILLINOIS, ASSIGNORS TO WINSLOW BOILER & ENGINEERING COMPANY, OF CHICAGO, ILLINOIS, A CORPORATION OF ILLINOIS.

BURNER.

1,383,719.    Specification of Letters Patent.    Patented July 5, 1921.

Application filed February 16, 1920. Serial No. 359,537.

*To all whom it may concern:*

Be it known that we, OLE G. HALVORSEN, a citizen of the Kingdom of Norway, residing at Chicago, Cook county, Illinois, FINN S. HUDSON, a citizen of the United States, residing at Kansas City, Jackson county, Missouri, and EDGAR G. RHOADS, a citizen of the United States, residing at Oak Park, Cook county, Illinois, have invented certain new and useful Improvements in Burners, of which the following is a specification, reference being had to the accompanying drawing.

Our invention relates to liquid fuel burners that are used in steam generators, and furnaces, or for other heating purposes, and it consists in the matters hereinafter disclosed and pointed out in the appended claims.

In the accompanying drawings, which illustrate one embodiment of our invention, Figure 1 is a longitudinal central sectional view on the line 1—1 of Fig. 2, with the motor in top plan;

Fig. 2 is a sectional view on the line 2—2 of Fig. 1, with the hub of the burner-head and its supporting block in section to show the oil passage;

Fig. 3 is a sectional view on the line 3—3 of Fig. 2;

Fig. 4 is a perspective view of the air-intake end of the burner, with the motor and its coupling omitted;

Figs. 5 and 6 are sectional views on the lines 5—5 and 6—6, respectively of Fig. 2;

Fig. 7 is an inside view in elevation of the intake end of the burner, on the line 7—7 of Fig. 2;

Fig. 8 is an enlarged sectional view of the burner-head, and

Fig. 9 is a transverse sectional view on the line 9—9, of Fig. 1.

In the drawings, the reference numeral 10 represents the burner-casing which is substantially circular in cross-section and somewhat reduced in cross-sectional area at its rear or discharge end 11; it may be of any suitable construction, and in the form shown is composed of three sections suitably connected together by bolts passing through the flanges 12 at their meeting ends. The air-intake end of the casing is provided with a supporting base 13 carried on the frame (not shown) and having an air-inlet 14 at its lower portion communicating with the outside air or a suitable source of air-supply as desired, and the discharge end of the casing is supported by suitable brackets 15 on the frame.

The operating shaft 16 is centrally journaled in the burner-casing in suitable journal-boxes 17 and 18 carried by bearing-blocks 19 and 20, respectively, the former being supported in one of the walls of the intake end of the casing and the latter being supported on the interior air-vanes 21 near the discharge end thereof. The shaft extends beyond the box 18 into and through an oil chamber 22 formed in the stationary hub 23 which is carried on the outer end of the box, this chamber being provided with an oil passage or duct 24 leading through the hub 23 and block 20 to an oil-pipe 25, which is connected with a suitable source of oil-supply 26 of either the well-known gravity or force-feed type. The inner end of the box 18 is provided with a stuffing-box 27, which is closed by a gland 28, to prevent the oil leaking from chamber 22 back along the shaft.

The shaft 16 is connected to a motor 29 by a suitable coupling 30 which permits the shaft to move axially as hereinafter described, and within the chamber 22 the shaft is reduced in diameter to provide a valve 31 which coöperates with a correspondingly shaped valve-seat 32 formed at the inner end of an oil passage in the partition 33 of the chamber 22, the passage in the partition being of greater diameter or cross-sectional area than the reduced portion of the shaft to insure the free flow of an adequate supply of oil to the burner-head when the valve is unseated. The outer end of the hub 23 is reduced and provided with a central bore through which the reduced end of the shaft freely passes, and also with suitable oil passages 34 outside of and concentric with this bore to form an annular burner-head to which the oil flows from the chamber 22 when the valve 31 is unseated.

The reduced portion of the shaft extends beyond the burner head and carries at its end an oil atomizing and spraying cap of cup-shaped contour; the base 35 of the cap is secured to the shaft end, and its body 36 extends over and incloses the reduced outer end of the hub 23 and has an inwardly directed flange 37 at its inner end to close the space between it and the reduced end of the hub. The outer end of the cap is provided with a series of oil-orifices 38 extending laterally through its base 35 and radially through the contiguous portions of its body, whereby when the cap is revolved the oil is atomized and sprayed out into the end of the casing 10 in a plurality of lines or streams extending radially toward the surface of the casing and laterally toward its open end. The base of the cap is provided on its exterior with a conical head 39 which prevents any vortex or the formation of any eddies; the head 39 forms a convenient means of securing the cap to the shaft as its tail 40 may extend through the base of the cap and be fixed to the shaft as shown.

The shaft is inclosed between the blocks 19 and 20 by a housing composed of the front and rear sections 41 and 42, the former being carried by the block 19 and the latter by the block 20, and the sections of the housing are spaced apart at their inner ends to provide space for the travel or movement of the interposed propeller 43 along the line of the shaft. The propeller is pinned to the shaft and has a central drum 44 of the same diameter as the housing but somewhat less in length than the distance between the inner ends of the housing sections to permit the propeller to move longitudinally of the line of the shaft, the drum being reduced at each end to make a telescopic fit with the sections of the housing so that the latter are closed in all positions of the propeller. The journal-box 17 at its inner end is shouldered and reduced in diameter to receive a sliding sleeve 45 which has an out-turned or radial flange 46 at its inner end and carries an expanding coiled spring 47, which reacts between the shoulder of the box 17 and the flange of the sleeve, and so tends to move the sleeve inwardly in the line of the shaft. The box 48 of a suitable ball-bearing is mounted in the shaft-housing, being frictionally held against rotation therein but adapted to move axially therein under the stress of the flange of the spring-pressed sleeve 45, the balls 49 of the bearing acting against a fin or collar 50 on the shaft 16, so that the normal stress of the spring 47 tends to move the shaft in its axial line to close the valve 31 in its seat, the shaft being arranged to have axial movement in its journal-boxes limited by box 17 and seat 32 to avoid the abutment of its drum with the inner ends of the housing sections 41 and 42. The journal-box 17 has threaded engagement with its block 19 so that the tension of the spring 47 and the axial travel of the shaft may be adjusted, a set-nut 51 holding the box in any adjusted position.

The section 42 of the shaft-housing frictionally carries at its inner end a ball-bearing box 52, similar in construction to the bearing 48, and moved by the axial movement of the shaft. The box 52 abuts against the radial or out-turned flange 53 of a sleeve 54, which is loosely carried on the shaft 16 and is surrounded by a coiled spring 55, which reacts between the flange and the end of the gland 28. The sleeve 54 is longer than its spring and extends into the gland, and the expansion of the spring 55 keeps the gland in place to close the stuffing-box 27 when the shaft is moved by the propeller to unseat the valve 31.

When the motor 29 is in operation and shaft 16 is revolved, the propeller 43 retracts the shaft axially toward the intake-end of the casing, overcoming the resistance of the spring 47 and withdrawing the valve 31 from its seat, so that the oil freely passes from the chamber 22 to the burner-head where it is sprayed out radially and forwardly toward the mouth of the casing; the propeller 43 also acts as a fan or blower to draw the air for combustion of the oil into the casing through its air-inlet 14 and force it forward to the flame zone. When the motor stops and the propeller ceases to revolve, the spring 47 expands and protracts the shaft axially to seat the valve 31 on its seat 32 to stop the passage of the oil to the burner. In both positions of the shaft the spring 55 holds the gland 28 in position in the stuffing-box 27, and as this spring is relatively weaker than the spring 47 it does not interfere with the protracting action of the latter to seat the valve 31. The sleeves 45 and 54 do not revolve, so each prevents any torque in its spring, and the springs have merely a pushing action.

A suitable spark-plug 56 is carried on one of the vanes 21 in proximity to the burner-head, and is included in an ignition circuit in any suitable manner, to ignite the fuel formed by the mixture of air and atomized oil. In the present form the circuit of the spark-plug is completed through the parts of the burner and casing to the binding-post 57. The spark-plug is used only to ignite the fuel, which then continues to burn so long as the shaft 16 is rotated, the spark-plug circuit being then opened.

The rotation of the spraying cap sprays the oil by centrifugal force into the flame zone described by the diameter of the casing in a manner that provides a constant volume of atomized oil filling the cross-sectional area thereof to a considerable depth or width, so that with a small feed or flow of oil a voluminous body of atomized oil of considerable length and width is produced in the flame zone; and as the oil is thus broken up and sprayed at high velocity by the rotation of the cap it is minutely and highly atomized, so that this large volume of atomized oil may be obtained by using kerosene or any heavy hydrocarbon fuel. The propeller not only moves the shaft to unseat the oil valve, but simultaneously draws the air for combustion of the oil into the casing through the air-inlet 14 and forces a large volume of air at high velocity into the finely atomized oil to insure the required large amount of air to oxygenize the large body of atomized oil to produce complete combustion of the fuel mixture to provide an intense flame. The shaft-housing forms a protecting shield about the internal parts, and with the drum of the propeller provides a surface that obviates any tendency to impede the velocity or decrease the volume of the air impelled into the flame-zone by the fan-propeller.

The air intake end of the casing above the inlet 14 is formed into a chamber extending across the casing and having its outer wall 58 curved upwardly and inwardly at its central portion as at 59 to a line slightly below the central axis of the casing and approximately in the vertical plane of the inner wall of the inlet 14, where it carries the shaft-block 19. A vertical vane 60 extending down from the central portion of the wall 59 divides the chamber at its center into lateral passages so that the air passing through the chamber is divided into substantially equal vertical streams. The lateral portions of the outer wall 58 of the air chamber at each side of the central portion 59 are carried upwardly at the sides of the shaft 16 as at 61, and thence are curved forwardly and inwardly toward the center of the casing as at 62 to form upwardly and centrally directed air passages leading to the upper half of the interior of the casing, their inner portions merging in the upper vertical partition 63. Each lateral air passage on the side of the vertical vane 60 is provided with a curved cross-vane 64, which has its low edge in the same transverse plane as the top edge of the vane 60 and thence curves rearwardly and upwardly toward the line of the inner end of the bearing-block 19, thereby dividing each lateral air passage into an inner and outer sub-passage leading respectively to the lower and upper portions of each side of the casing. By this arrangement the air flowing into the casing through the inlet 14 is divided into four equal streams, each passing to a quarter of its area. The interior of the casing is provided with air vanes on the suction side of the fan to maintain this equality of air supply to all portions of its area. Four air vanes extend radially from the housing 42 to the casing on the suction side of the fan, being arranged in a horizontal pair 65, 66, and in a vertical pair 67, 68, as shown in Fig. 5. The horizontal pair extend forwardly from the upper ends of the curved vanes 64, and the vertical pair extend in the plane of the vertical vane 60 and partition 63. The casing is also provided with air-vanes on the exhaust side of the fan to uniformly distribute the air in all portions of the flame zone to provide uniform combustion throughout the body of atomized oil. For this latter purpose, on the exhaust side of the fan four air-vanes 21 extend radially from the housing 42 to the burner casing, being arranged in pairs similar to the vanes on the intake side of the fan, the horizontal and vertical vanes of both sections being respectively in alinement and with their inner ends spaced apart to provide clearance for the propeller in its protracted and retracted positions. The vanes 21, being respectively in extension of other vanes along the line of the casing, guide the air into the flame zone in equal proportions so that it is uniformly distributed throughout the body of atomized oil therein. The vanes 21 also prevent the air on the exhaust side of the fan taking any rotary motion or whirling motion in the casing, and so insure its passage to the flame zone in substantially longitudinal lines along the length of the casing.

The axial movement of the shaft is limited by the valve-seat 32 in one direction, and by the inner end of the adjustable box 17 in the other, the shaft being reduced and shouldered adjacent the box as shown in Fig. 3 for this purpose, the adjustment of the box of course varying the extent of such movement of the shaft.

We claim:

1. A liquid fuel burner comprising a casing having an air-inlet and a flame-exit, a burner-head having an oil-supply valve, a fan to force air to the head, and connections between the fan and valve to open and close the latter when the former is operating and at rest respectively.

2. A liquid fuel burner comprising a casing having an air-inlet and a flame exit, a burner-head adjacent the flame-exit having an oil-supply passage, a fan to force air to the burner-head, a valve normally closing the oil-supply passage, and means to simultaneously control the valve and fan.

3. A liquid fuel burner comprising a casing having an air-inlet and a flame-exit, a burner-head adjacent the flame exit, an oil-supply chamber having an oil-passage to the head in the axial line of the casing, a rotatable and axially movable shaft having a valve for said oil-passage, a propeller to retract the shaft when the latter is rotated to unseat the valve, and means to protract the shaft when it is not rotated to seat the valve, 4. A liquid fuel burner comprising a casing having an air-inlet and a flame-exit, a burner-head adjacent the flame-exit, an oil-supply chamber having an oil-passage to the head in the axial line of the casing, a spring-pressed rotatable and axially movable shaft having a valve to normally close said oil-passage, and a propeller to move the shaft against the pressure of its spring to unseat the valve when the shaft is rotated.

5. A liquid fuel burner comprising a casing having an air-inlet and a flame-exit, a burner-head adjacent the flame-exit, an oil-supply chamber having an oil-passage to the head in the axial line of the casing, a spring-pressed rotatable and axially movable shaft having a valve to normally close said oil-passage, and a combined fan and propeller on the shaft to move it axially against the pressure of its spring to unseat the valve and to force air to the burner-head when the shaft is rotated.

6. A liquid fuel burner comprising a casing having an air-inlet and a flame-exit, a burner-head adjacent the flame-exit, an oil-supply chamber having an oil-passage to the head in the axial line of the casing, a spring-pressed axially movable shaft passing through the head and its oil-passage and having a valve to normally close said passage, means to rotate the shaft, a propeller on the shaft to move it against the pressure of its spring to unseat the valve when the shaft is rotated, and a spraying-cap on the shaft surrounding the oil-outlet of the head.

7. A liquid fuel burner comprising a casing having an air-inlet and a flame-exit, a burner-head, an oil-supply chamber having an oil-passage to the head in the axial line of the casing, a rotatable and axially movable shaft having a valve for said oil-passage, a propeller on the shaft to move it in one direction to unseat the valve when the shaft is rotated, a bearing on the shaft, an abutment adjacent the bearing, a sleeve on the shaft between the abutment and bearing, a flange on the sleeve in contact with the bearing, and a spring reacting between the flange and abutment to oppositely move the shaft to seat the valve when the rotation of the shaft ceases.

8. A liquid fuel burner comprising a casing having an air-inlet and a flame-exit, a burner-head, an oil-supply chamber having an oil-passage in the axial line of the casing, an axially movable shaft passing through said chamber and having a valve to close said oil-passage, a stuffing-box for the shaft adjacent the oil-chamber and having an axially movable gland, a bearing on the shaft adjacent the gland, a sleeve on the shaft between the gland and bearing, a flange on the sleeve in contact with the bearing, a spring reacting between the flange and gland, and means to axially move the shaft to open and close the valve.

9. A liquid fuel burner comprising a casing having an air-inlet and a flame-exit, a burner-head, a fan to force air to the head, the casing being curved inwardly over the air-inlet at its central portion and extended upwardly and inwardly on either side thereof to form lateral air-passages to the upper portion of the casing, a vertical air-vane below and in the median line of the central portion, and downwardly curved cross-vanes at the sides of the vertical vanes to divide the lateral air-passages.

10. A liquid fuel burner comprising a casing having an air-inlet and a flame-exit, a burner-head, a fan to force air to the head, air-vanes in the casing above the air-inlet and dividing the intake-end thereof into a plurality of air-passages, air-vanes on the suction side of the fan extending the air-passages to the fan, and air-vanes in the casing on the exhaust side of the fan and extending said air-passages from the fan to the burner-head.

11. A liquid fuel burner comprising a casing having an air-inlet and a flame-exit, a burner-head, two sets of air-vanes in the casing dividing its interior into a plurality of air-passages and spaced apart at their inner ends, a rotatable and axially movable shaft having an oil-valve for said burner, a propeller on the shaft between the two sets of vanes to retract the shaft when the latter is rotated to unseat the valve, and means to protract the shaft when it is not rotated to seat the valve.

12. A liquid fuel burner comprising a casing having an air-inlet and a flame-exit, a burner-head adjacent the flame-exit, an oil-supply chamber having an oil-passage to the head in the axial line of the casing, a spring-pressed rotatable and axially movable shaft having a valve to normally close said oil-passage, a propeller to move the shaft against the pressure of its spring to unseat the valve when the shaft is rotated, and air-vanes in the casing between the propeller and burner-head.

13. A liquid fuel burner comprising a casing having an air-inlet and a flame-exit, a burner-head adjacent the flame-exit, an oil-supply chamber having an oil-passage to the head in the axial line of the casing, a spring-pressed rotatable and axially movable shaft having a valve to normally close said oil-passage, and a combined fan and propeller on the shaft to move it axially against the pressure of its spring to unseat the valve and to force air to the burner-head when the shaft is rotated, and air-vanes in the casing on opposite sides of the fan-propeller.

14. A liquid fuel burner comprising a casing having an air-inlet and a flame-exit, a burner-head adjacent the flame-exit, an oil-supply chamber having an oil-passage to the head in the axial line of the casing, a spring-pressed axially movable shaft passing through the head and its oil-passage and having a valve to normally close said passage, means to rotate the shaft, a propeller on the shaft to move it against the pressure of its spring to unseat the valve when the shaft is rotated, and two sets of air-vanes in the casing, one set on each side of the propeller, and each set having vertical and horizontal members in corresponding planes to divide the interior of the casing into four longitudinal air-passages.

OLE G. HALVORSEN.

Witnesses:
HARRY S. HARNED,
J. McROBERTS.

FINN S. HUDSON.
EDGAR G. RHOADS.

Witnesses:
B. F. FUNK,
NE VADA PRAURTZ.